US012655828B2

(12) United States Patent
Couñago Lorenzo et al.

(10) Patent No.: US 12,655,828 B2
(45) Date of Patent: Jun. 16, 2026

(54) FLOATING PLATFORM DEVICE FOR A WIND TURBINE TOWER AND ASSEMBLY METHOD

(71) Applicant: BLUENEWABLES SL, Guía de Isora (ES)

(72) Inventors: Bernadino Couñago Lorenzo, Madrid (ES); Óscar Sainz Ávila, Rotterdam (NL); Ismael Fernández Gil, Los Cristianos (ES); Cecilio Barahona Oviedo, Madrid (ES); Sergio Hernández Blanco, Valdemorillo (ES); Enrique Rechina Mateos, Móstoles (ES)

(73) Assignee: BLUENEWABLES SL, Guía de Isora (ES)

( * ) Notice: Subject to any disclaimer, the term of this patent is extended or adjusted under 35 U.S.C. 154(b) by 327 days.

(21) Appl. No.: 18/691,651

(22) PCT Filed: Sep. 16, 2022

(86) PCT No.: PCT/EP2022/075733
§ 371 (c)(1),
(2) Date: Mar. 13, 2024

(87) PCT Pub. No.: WO2023/041687
PCT Pub. Date: Mar. 20, 2023

(65) Prior Publication Data
US 2025/0129766 A1 Apr. 24, 2025

(30) Foreign Application Priority Data
Sep. 17, 2021 (ES) ............................... ES202130867

(51) Int. Cl.
*F03D 13/25* (2016.01)
*B63B 5/14* (2006.01)
(Continued)

(52) U.S. Cl.
CPC .............. *F03D 13/256* (2023.08); *B63B 5/14* (2013.01); *B63B 35/44* (2013.01); *B63B 39/03* (2013.01);
(Continued)

(58) Field of Classification Search
CPC ......... F03D 13/256; B63B 5/14; B63B 35/44; B63B 39/03; B63B 2035/446; F05B 2240/93; F05B 2240/95
See application file for complete search history.

(56) References Cited

U.S. PATENT DOCUMENTS

| | | | | |
|---|---|---|---|---|
| 2013/0000540 A1* | 1/2013 | Rijken | ................... | B63B 1/107 |
| | | | | 405/223.1 |
| 2014/0250806 A1* | 9/2014 | Schibsbye | ............... | E02D 27/42 |
| | | | | 52/223.13 |
| 2015/0104259 A1 | 4/2015 | Johnson | | |

FOREIGN PATENT DOCUMENTS

| | | |
|---|---|---|
| CN | 108407987 A | 8/2018 |
| CN | 110382344 A | 10/2019 |

(Continued)

*Primary Examiner* — Stephen P Avila
(74) *Attorney, Agent, or Firm* — Menachem Nathan; Nathan & Associates

(57) ABSTRACT

The present invention relates to a device for the support and foundation of a wind turbine tower. Said device comprises a main body (1) made at least partially of concrete. It also comprises a transition part (2) attached to the main body (1) and a plurality of installation elements (3) located on the main body. The transition part (2) comprises a housing (4) for installing a wind turbine tower, and each installation element (3) comprises a through hole (5) for installing an anchoring tendon.

8 Claims, 5 Drawing Sheets

(51) Int. Cl.
    B63B 35/44          (2006.01)
    B63B 39/03          (2006.01)

(52) U.S. Cl.
    CPC ..... *B63B 2035/446* (2013.01); *F05B 2240/93*
               (2013.01); *F05B 2240/95* (2013.01)

(56)          References Cited

FOREIGN PATENT DOCUMENTS

| | | | |
|---|---|---|---|
| CN | 111674519 | A | 9/2020 |
| CN | 113279918 | A | 8/2021 |
| ES | 2229192 | T3 | 4/2005 |
| ES | 2454044 | A1 | 4/2014 |
| JP | 2012011845 | A | 1/2012 |
| WO | 2010029766 | A1 | 3/2010 |
| WO | 2021094630 | A1 | 5/2021 |

* cited by examiner

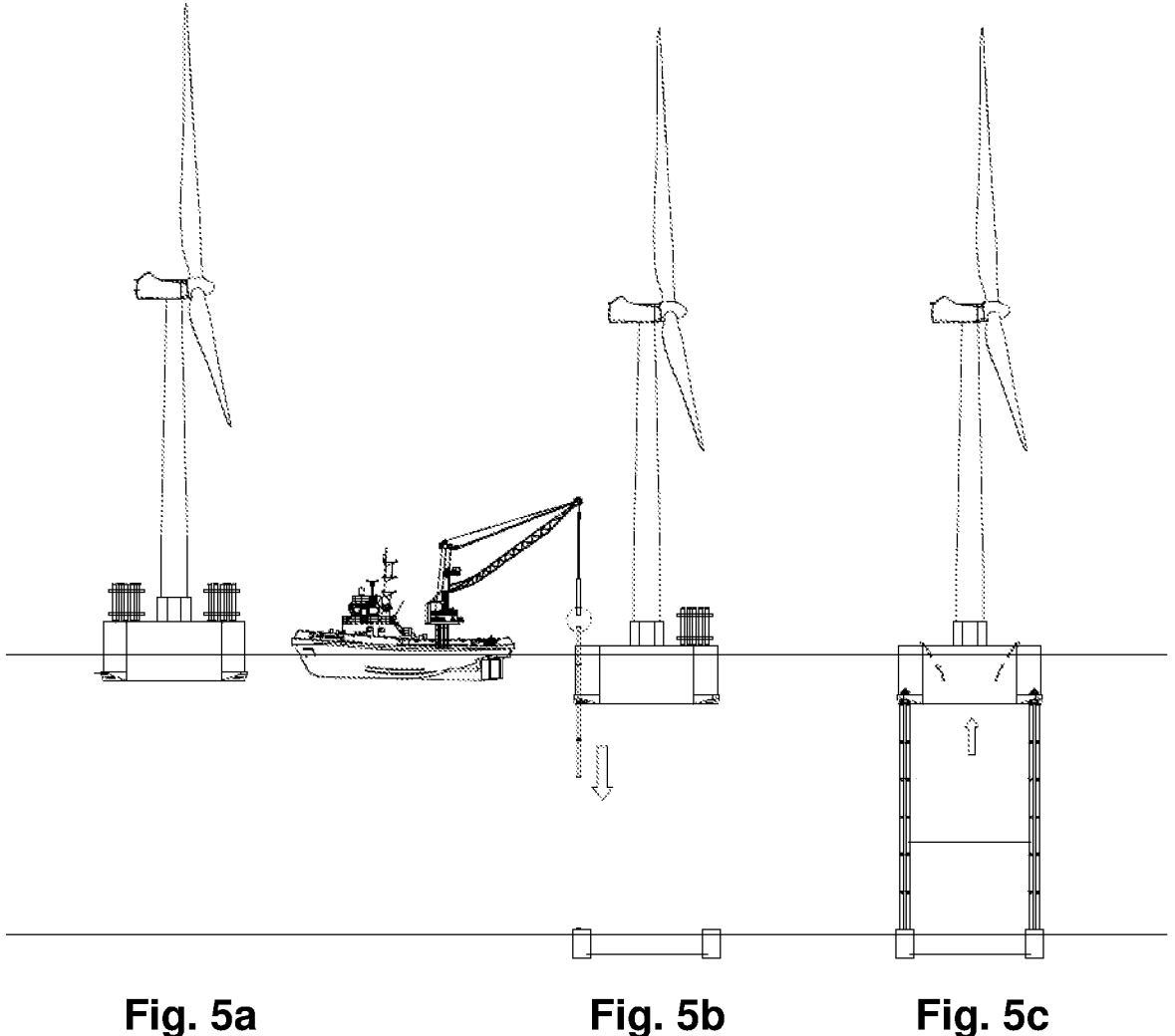
Fig. 5a          Fig. 5b          Fig. 5c

FLOATING PLATFORM DEVICE FOR A WIND TURBINE TOWER AND ASSEMBLY METHOD

FIELD OF THE INVENTION

The present invention is comprised among wind turbine platforms installed offshore, as well as among the means needed for such installation.

BACKGROUND OF THE INVENTION

When installing an offshore wind turbine, a system suitable for the foundation and stabilization thereof must be provided.

There are a number of methods and devices dedicated to such purpose. They can all be classified according to four types of classifications based on how it obtains stability of the structure: semisubmersible platforms, TLPS, SPARs or barges.

Semisubmersible platforms are platforms with a stability that is acquired as a result of their immense buoyancy inertia with high metacentric radii, thus offsetting their high center of gravity. They are characterized by good offshore performance, but according to the development of wind turbine powers (which are increasingly higher), these are acquiring large sizes, making it difficult to find construction docks and ports with the required dimensions and drafts.

TLPs (Tension-Leg Platforms) are platforms which acquire stability by means of their anchoring system, which is tensioned as the main structure has a hydrostatic buoyancy force greater than the weight thereof. The offshore performance of platforms of this type is exceptional, with the drawback of the difficulties involved in installing them due to the large sized tendons dimensions arranged therein.

SPAR platforms are platforms which acquire their stability as a result of their center of gravity being in a lower position than their center of buoyancy. Due to their transparency to the action of the waves as a consequence of their small surface area and their high natural periods, they have an exceptional offshore performance.

Like semisubmersible platforms, barges acquire their stability as a result of their high buoyancy inertia with a worse offshore performance.

The invention described below is comprised within the concept of the TLP structures. In addition to the installation problems inherent to this type of platform, it should be noted that many of these platforms do not have the stability needed for transport; however, this is not the case of the invention being described.

In terms of installation systems, the state of the art can be classified into structures capable of being transported with the power generation equipment installed on land and others that either require the equipment to be installed once the platform has been fixed in position or require auxiliary means of transport to ensure stability at all times.

In terms of platform construction processes, the assembly of the tower (whether in port or at its operating location), the transport of the floating structure (or the wind turbine and platform assembly) and the installation thereof are critical, and have their own technical requirements regarding buoyancy, inertias and equipment necessary for their execution.

The present invention provides an alternative solution with respect to those that are already known.

BRIEF DESCRIPTION OF THE INVENTION

Unless otherwise defined, all terms (both scientific and technical) used in this document are to be interpreted as a person skilled in the art would interpret them. It is understood, therefore, that terms of common use should be interpreted as a person skilled in the art would interpret them, and not in an idealized or strictly formal manner.

Throughout the text, the word "comprises" (and derivatives thereof such as "comprising") are not to be understood in an exclusive manner, but rather are to be understood in the sense that they allow for the possibility that what is defined may include additional elements or steps.

One object of the present invention relates to a device for the support and foundation of a wind turbine tower, the device comprising:

a main body made at least partially of concrete;
   a transition part attached to the main body, the transition part comprising a housing for installing a wind turbine tower
   a plurality of installation elements located on the main body, with each installation element comprising a through hole.

This type of floating device optimizes the construction process of floating structures and minimizes their construction and installation costs, since the structure allows integrated transport without the need for large support vessels in any of the phases of its life cycle.

In particular embodiments, at least 90% of the main body is made of concrete, particularly at least 95% of the main body.

Reference to concrete throughout the document is understood to refer to reinforced concrete, which includes the mass of concrete together with a basic reinforcement made of metal, usually steel. Therefore, when estimating the percentage of the main body made of concrete, it is comparing the percentage by weight of reinforced concrete (including the metal reinforcement) versus the auxiliary parts that may be made of another material.

This allows the manufacturing cost to be reduced, with concrete being perfectly suited to manufacture the device of the invention.

In particular embodiments, the installation elements comprise a housing intended for receiving an anchoring tendon head.

Installation of the anchoring tendons in the main body itself is thereby allowed.

In particular embodiments, the main body has a prismatic shape, and the transition part also has a prismatic shape, with the axis of the prism of the main body coinciding with the axis of the prism of the transition part.

In particular embodiments, the prism of the main body has beveled vertexes, where the installation elements project from the bevels.

Since the installation elements (and therefore anchoring tendons) are located on the periphery, assembly stability is thereby increased.

In particular embodiments, the main body comprises:

a first polygonal-shaped base;
   a second polygonal-shaped base parallel to the first base;
   a side wall joining the first base and the second base, with an inner volume comprised between the first base, the second base and the side wall being defined;
   a plurality of ribs comprised in the inner volume, with each rib being in contact with at least one of the bases.

In particular embodiments, the installation elements project from the bevels at the height of the second base.

This position of the installation elements at the height of the second base (i.e., projecting from the bevels made in the second base) is advantageous due to the performance of concrete under compression: when tensing the anchoring tendons inserted in the installation elements, the latter apply a compressive force on the concrete of the side wall, creating a more favorable tension in the concrete than if they were located on the first base, where a tensile stress field would be created.

In particular embodiments, both the upper face and the lower face have a hexahedral shape, wherein both the upper and lower faces are the same, although in other embodiments they may not have the same dimensions. The use of polygons on all faces leads to great manufacturing ease since it allows both the side walls and the upper and lower faces to be constructed by means of rectangular panels. Furthermore, this structure allows the use of the inner space as ballasting tanks, while at the same time as structural elements to increase rigidity of the assembly.

In particular embodiments, the transition part traverses the second base and has a portion inserted into the inner volume, with some ribs being in contact with said portion comprised within the inner volume.

The positioning of the transition part, which will serve to support the wind turbine tower, is thereby ensured.

In particular embodiments, the device further comprises
a ladder located on the side wall,
a horizontal platform located on the second base, which connects the ladder with the transition part;
an access platform at the base of the tower located in the transition part;
a vertical ladder in the transition part which connects the horizontal platform with the access platform at the base of the tower;
a rail-mounted crane, located on the second base, configured for moving parallel to the horizontal platform.

The presence of the upper base, which will usually be above sea level, allows the use thereof as a horizontal platform for assembling a rail-mounted crane or a continuous ladder, from the side wall to the access at the base of the tower located in the transition part.

In particular embodiments, the main body comprises a plurality of tanks, where
each tank comprises a ballast valve, with one of the ballast valves being adapted to be attached to a manifold;
each tank comprises a vent valve; and
each tank comprises a high-pressure valve.

The tanks allow the ballasting and deballasting of the main body in a simple manner, such that the prestressing of the tendons can be performed without needing the support of large crane ships. The immersion, followed by the lashing of the tendons and subsequent deballasting of the platform, generates in the tendons the prestressing needed for correct offshore performance during the operation phase. In particular embodiments, another type of ballasting system can be used, using the pumps and compressors on the support ships.

In these cases, the ballasting operation is carried out by connecting a ballast hose between the support vessel and the platform. The support ship will pump the ballast water into the corresponding tank by means of the ballast inlet valve until optimal filling is reached. Subsequently, by means of manipulating the manifold it will be directed to the next tank to be filled in the ballasting sequence.

The deballasting operation is performed by closing the low-pressure vent valves and injecting pressurized air through the high-pressure circuit until exceeding the hydrostatic pressure. This allows the ballast tank to be overpressurized such that the increase in pressure can cause the height of the water to rise until reaching the height of the manifold, and it can be intended for offshore use.

The use of external pumping and deballasting means allows both the filling and the emptying of the inside of the main body, which represents an advantage in terms of savings in equipment needs, and furthermore allows the dismantling of the structure to be carried out when said structure is ballasted, the tendons to be uncoupled and thus return to their transport condition once it has been deballasted.

In a second inventive aspect, the invention provides an installation method for installing a device according to the first inventive aspect, the method comprising the steps of
placing a wind turbine tower in the transition part;
performing a first ballasting of the device for transport;
transporting the assembly formed by the device and the wind turbine tower to an offshore installation site, where a series of anchoring tendons are transported on the second base;
performing a second ballasting of the platform device for the installation of the anchoring tendons;
installing the anchoring tendons in the installation elements of the device; and
gradually deballasting the device.

The installation of the device together with the tower without the need for auxiliary means to carry the tendons or any other element needed for the installation is thereby allowed.

In particular embodiments, the step of deballasting the device is performed by calculating the total weight of the device and the wind turbine tower and deballasting until the buoyancy force is such that said total weight reaches a design value comprised between 25% and 35% of the buoyancy force.

This method allows incredible stability while the floating device is traveling to the point of installation and operation, and it also restricts movements due to the environmental forces during the operation, as a consequence of the tensed anchoring system.

BRIEF DESCRIPTION OF THE FIGURES

To complete the description and help to better understand the invention, a set of figures is attached to the description. These figures are part of the description and illustrate a particular example of the invention, which is not to be interpreted as being limiting of the scope thereof, but rather as a mere example of how the invention can be carried out. This set of figures comprises the following:

FIGS. 5a to 5c show a series of steps in an installation method for installing the device described in the preceding figures.

In order to help better understand the technical features of the invention, the mentioned figures are accompanied by a series of reference numbers which, in an illustrative and non-limiting manner, represent the following:

| 1 | Main body |
| 2 | Transition part |
| 3 | Installation elements |
| 4 | Housing in the transition part |
| 5 | Through hole in the installation element |
| 6 | Housing in the installation element |
| 7 | Ribs |
| 8 | Ladder |
| 9 | Tendon stowage |
| 10 | Horizontal platform |
| 11 | Lower base |
| 12 | Upper base |
| 13 | Side wall |
| 14 | Access platform |
| 15 | Vertical ladder |
| 16 | Crane |

DETAILED DESCRIPTION OF THE INVENTION

Figure 1:
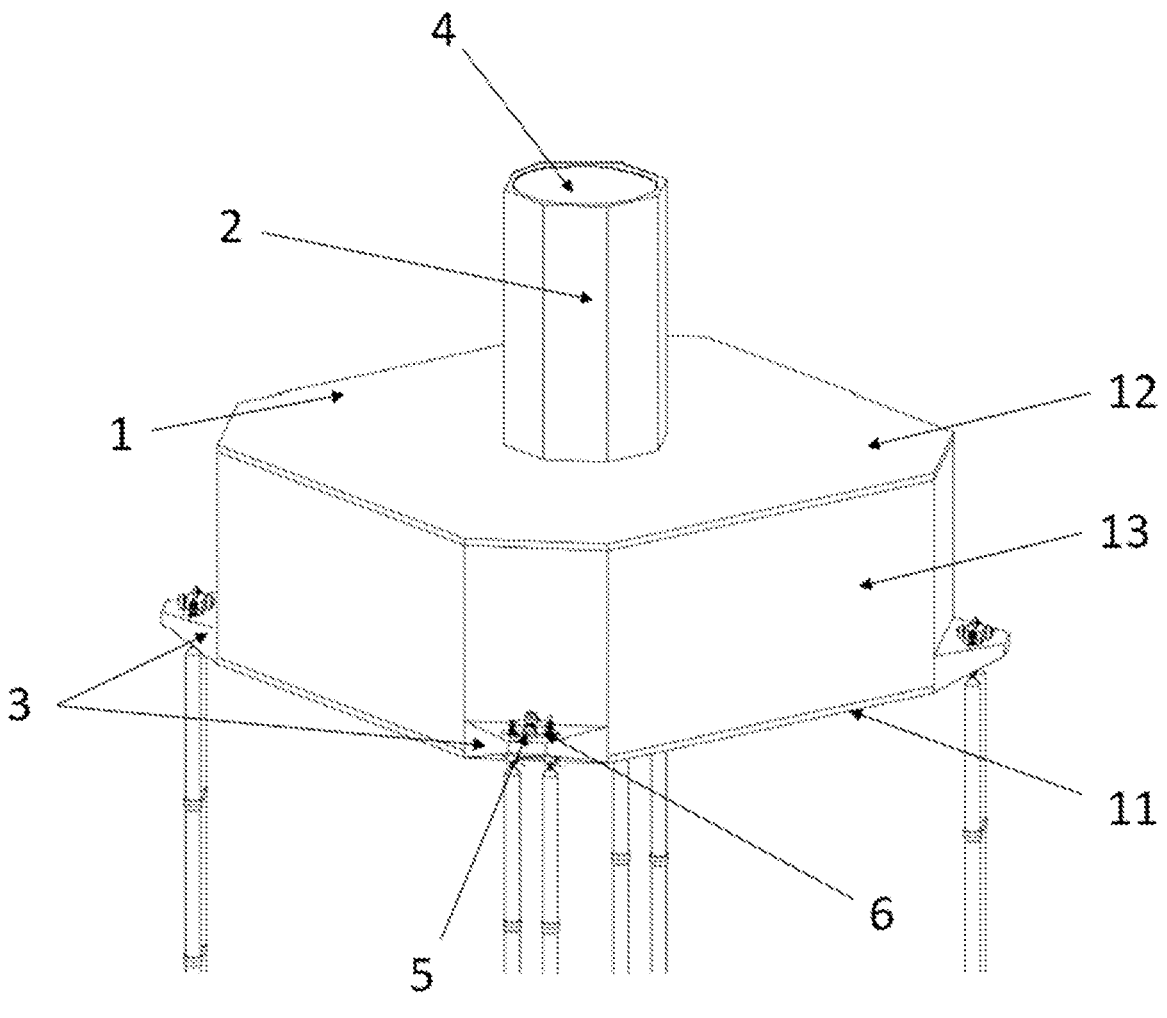
FIG. 1 shows a particular embodiment of a device for the support and the foundation of a wind turbine tower according to the invention.

FIG. 1 shows a particular embodiment of a device for the support and the foundation of a wind turbine tower according to the invention.

As can be seen in the figure, the device comprises:
a main body 1 made of reinforced concrete;
a transition part 2 attached to the main body 1; and
a plurality of installation elements 3 located on the main body 1.

The device shown in the figure is intended for being the support and the foundation of a wind turbine tower installed offshore. To that end, the transition part 2 comprises a housing 4 for installing the wind turbine tower. This process can be performed on land to take the device-tower assembly to the point of installation.

The main body 1 is intended for providing the stability needed during transport and installation of the wind turbine tower. This main body has a triangular prismatic shape with beveled vertexes. Therefore, it is a hexagonal prism. Therefore, there is a first lower base 11, a second upper base 12 parallel to the first base and a side wall 13 joining the first base and the second base, with an inner volume (not visible in this figure) comprised between the first base, the second base and the side wall being defined.

The installation elements 3 are positioned in the beveled vertexes, each of said elements comprising a through hole 5 and a housing 6 intended for receiving an anchoring tendon head, since these installation elements will serve as guidance and support for the installation of the anchoring tendons.

The transition part 2 also has a prismatic shape, with the axis of the prism of the main body coinciding with the axis of the prism of the transition part. The wind turbine tower is thereby successfully placed in the center of the installation device, allowing better stability during transport and installation.

Figure 2:
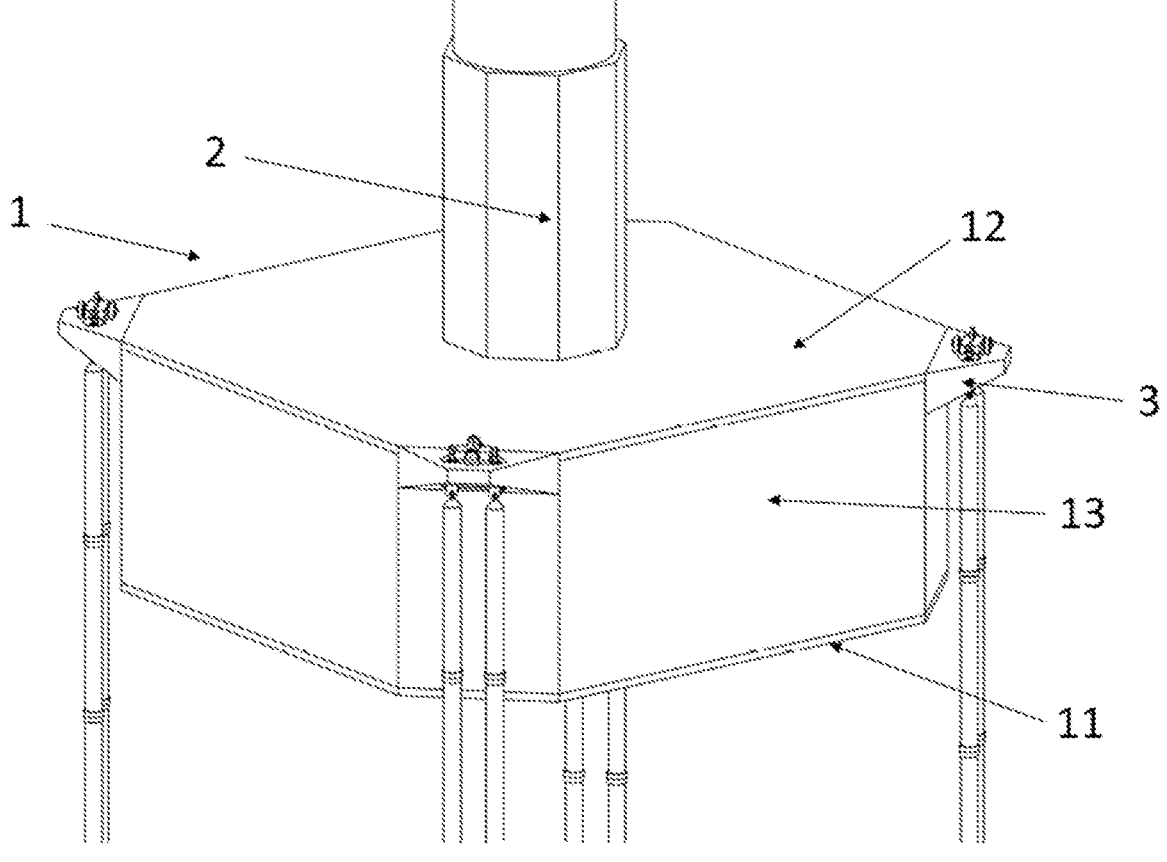
FIG. 2 shows an alternative embodiment of a device for the support and the foundation of a wind turbine tower according to the invention.

FIG. 2 shows an alternative location of the installation elements 3, which are located in the upper area, projecting from the second base 12 of the main body. This location is especially advantageous in the case of concrete, which works under tension, because when the anchoring tendons are inserted into these installation elements 3 and tensioned, the stresses caused in the concrete are tensile stresses of the installation element 3 on the side wall 12. Therefore, this embodiment is especially advantageous.

Figure 3:
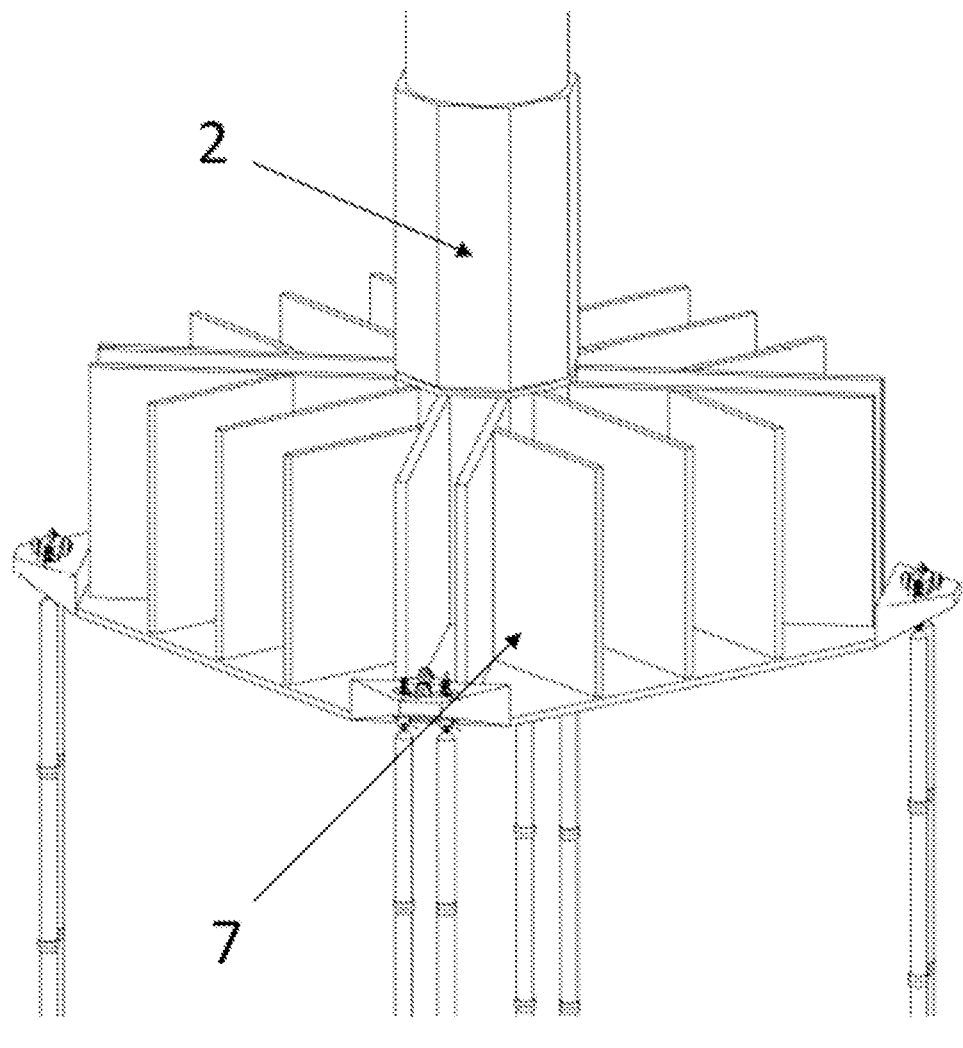
FIG. 3 shows a view of the device of FIG. 1 in which the upper base has been eliminated.

FIG. 3 shows a view of the device of FIG. 1 in which the upper base has been eliminated. A plurality of ribs 7 comprised in the inner volume (which is visible in this figure) are thereby exposed, each rib 7 being in contact with at least one of the bases.

As can be observed in this figure, the transition part 2 traverses the second base and has a portion inserted into the inner volume, being some ribs 7 in contact with said portion comprised within the inner volume.

There is also a series of ballast valves, adapted for being attached to a manifold located on deck. These ballast valves will receive the ballast hose when ballasting the main body and, by means of pipes, are directed to each tank in order to fill same.

Furthermore, there are also vent valves, which are used to expel the air existing inside the tank when said tank is being filled with the ballast water.

Lastly, there are also high-pressure valves which are used to introduce compressed air into the tanks to empty out the ballast water in the deballasting process.

Figure 4:
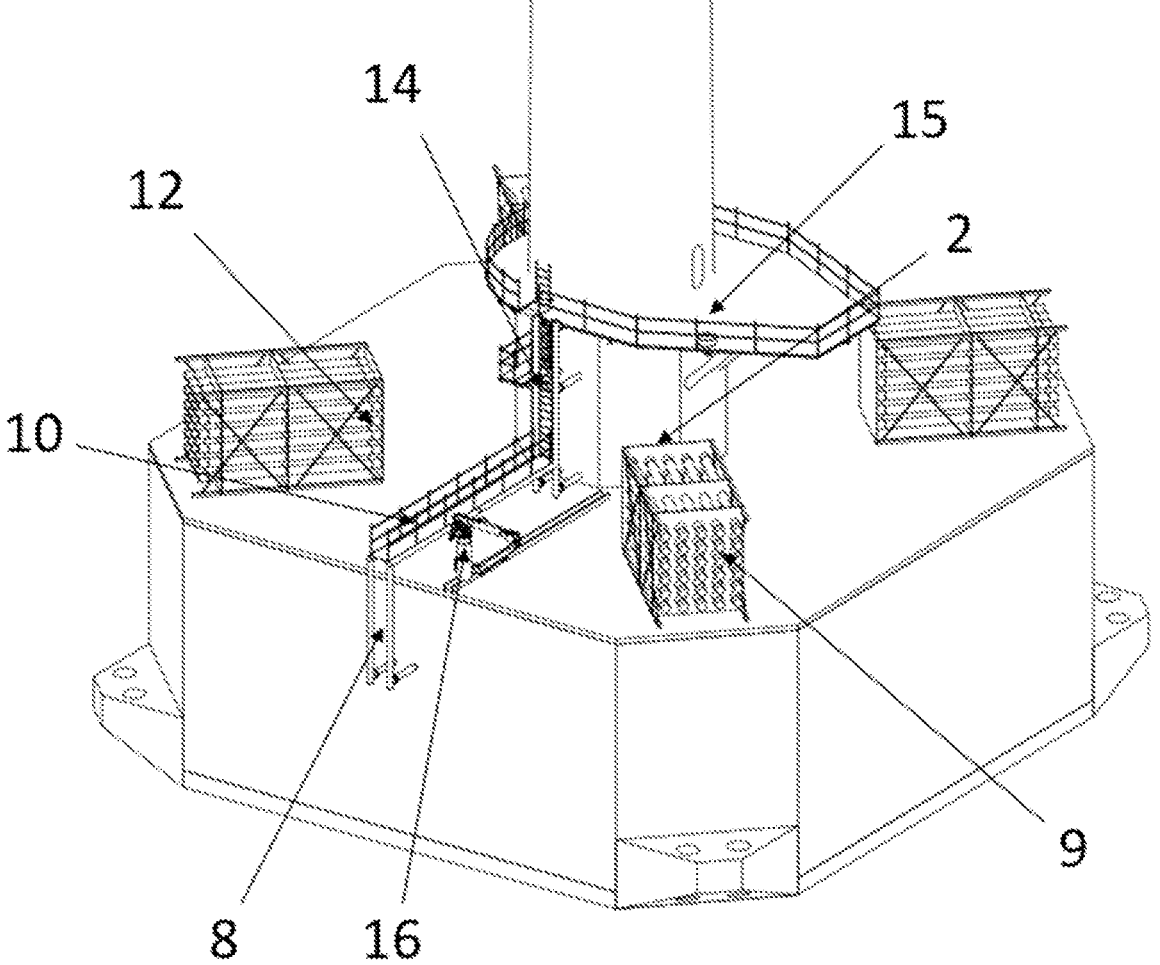
FIG. 4 shows a construction detail of the foundation device, in which access elements for accessing the platform and a stowage alternative the tendons on deck are observed.

FIG. 4 shows a construction detail of the foundation device in which access elements for accessing the platform are observed.

First, there is a ladder 8 located on the side wall 13. The stowage of the tendons 9, located on the second base 12, can also be observed.

A horizontal platform 10 which connects the ladder 8 with the transition part 2 is also observed on the second base 12. Furthermore, this horizontal platform 10 continues into an access platform 14, intended for providing access to the base of the tower located in the transition part 2. Lastly, there is a vertical ladder 15 in the transition part 2 itself, which connects the horizontal platform 10 with the access platform at the base of the tower.

To facilitate tower installation tasks, or tasks for handing the maintenance or repair material, there is also a rail-mounted crane 16 located on the second base 12, configured for moving across the horizontal platform 10.

FIGS. 5a to 5c show a series of steps in an installation method for installing the device described in the preceding figures.

FIG. 5a shows a first installation step, in which the assembly formed by the foundation device and a wind turbine tower installed in the transition part is assembled at port and, after a first ballasting of the device, is towed to the installation site. Durante this towing step, the anchoring tendons are transferred on the second base of the foundation device, so no auxiliary installation means are needed.

FIG. 5b shows a subsequent installation step in which the anchoring tendons are inserted into the corresponding holes of the main body, and a first ballasting of the device takes place for the prestressing of the anchoring tendons.

In these cases, the ballasting operation is carried out by connecting a ballast hose between the support vessel and the platform. The support ship will pump the ballast water into the corresponding tank by means of the ballast inlet valve until optimal filling is reached. Subsequently, by means of manipulating the manifold it will be directed to the next tank to be filled in the ballasting sequence.

Lastly, FIG. 5c shows how selective deballasting of the device for tensioning the anchoring tendons is performed.

The deballasting operation is performed by closing the low-pressure vent valves and injecting pressurized air through the high-pressure circuit until exceeding the hydrostatic pressure. This allows the ballast tank to be over-pressurized such that the increase in pressure can cause the height of the water to rise until reaching the height of the manifold, and it can be intended for offshore use.

During this step of deballasting the device, first the total weight of the device and the wind turbine tower is calculated, and then the deballasting of the device takes place until the buoyancy force is such that said total weight reaches a design value comprised between 25% and 35% of the buoyancy force.

The invention claimed is:

1. A device for the support and foundation of a wind turbine tower, the device comprising: a main body made at least partially of concrete, wherein the main body is configured to provide a hydrostatic buoyancy force greater than the weight of the main body;

a transition part attached to the main body, the transition part comprising a housing for installing a wind turbine tower;

a plurality of installation elements located on the main body, with each installation element comprising a through hole;

the device being characterized in that the main body has a prismatic shape, and the transition part also has a prismatic shape, with the axis of the prism of the main body coinciding with the axis of the prism of the transition part;

the main body comprises a first polygonal-shaped base, a second polygonal-shaped base parallel to the first base, a side wall joining the first base and the second base, defining an inner volume comprised between the first base, the second base and the side wall, and a plurality of ribs comprised in the inner volume, with each rib being in contact with at least one of the bases;

the prism of the main body has beveled vertexes, where the installation elements project from the bevels.

2. The device according to claim 1, wherein at least 90% of the main body is made of concrete.

3. The device according to claim 1, wherein the installation elements comprise a housing intended for receiving an anchoring tendon head.

4. The device according to claim 1, wherein the transition part traverses the second base and has a portion inserted into the inner volume, with some ribs being in contact with said portion comprised within the inner volume.

5. The device according to claim 1, further comprising a ladder located on the side wall, a horizontal platform located on the second base, which connects the ladder with the transition part;

an access platform at the base of the tower located in the transition part;

a vertical ladder in the transition part which connects the horizontal platform with the access platform at the base of the tower;

a rail-mounted crane, located on the second base, configured for moving parallel to the horizontal platform.

6. The device according to claim 1, wherein the main body comprises a plurality of tanks, where each tank comprises a ballast valve, with one of the ballast valves being adapted to be attached to a manifold;

each tank comprises a vent valve; and each tank comprises a high-pressure valve.

7. An installation method for installing a device according to claim 1, the method comprising the steps of placing a wind turbine tower in the transition part;

performing a first ballasting of the device for transport;

transporting the assembly formed by the device and the wind turbine tower to an offshore installation site, where a series of anchoring tendons are transported on the second base;

performing a second ballasting of the platform device for the installation of the anchoring tendons;

installing the anchoring tendons in the installation elements of the device; and gradually deballasting the device.

8. The method according to claim 7, wherein the step of deballasting the device is performed by calculating the total weight of the device and the wind turbine tower and deballasting until the buoyancy force is such that said total weight reaches a design value comprised between 25% and 35% of the buoyancy force.

*    *    *    *    *